United States Patent
Ohta et al.

(10) Patent No.: US 10,602,868 B2
(45) Date of Patent: Mar. 31, 2020

(54) HEATING COOKER

(71) Applicant: Panasonic Intellectual Property Management Co., Ltd., Osaka (JP)

(72) Inventors: Katsuyuki Ohta, Shiga (JP); Makoto Nishimura, Shiga (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 365 days.

(21) Appl. No.: 15/531,955

(22) PCT Filed: Aug. 3, 2016

(86) PCT No.: PCT/JP2016/003569
§ 371 (c)(1),
(2) Date: May 31, 2017

(87) PCT Pub. No.: WO2017/033407
PCT Pub. Date: Mar. 2, 2017

(65) Prior Publication Data
US 2017/0360237 A1    Dec. 21, 2017

(30) Foreign Application Priority Data

Aug. 27, 2015  (JP) ................................ 2015-167692

(51) Int. Cl.
*A47J 27/00*    (2006.01)
*A47J 43/07*    (2006.01)
(Continued)

(52) U.S. Cl.
CPC .............. *A47J 27/00* (2013.01); *A47J 27/004* (2013.01); *A47J 36/165* (2013.01); *A47J 43/046* (2013.01); *A47J 43/0722* (2013.01)

(58) Field of Classification Search
CPC ........ A47J 43/046; A47J 27/004; A47J 27/00; B01F 7/16; B01F 7/00008
(Continued)

(56) References Cited

U.S. PATENT DOCUMENTS 5,031,518 A * 7/1991 Bordes .................... A47J 27/14
241/37.5
5,768,978 A * 6/1998 Dorner .................. A47J 36/165
99/348

(Continued)

FOREIGN PATENT DOCUMENTS

JP           5250428 B2    4/2013
JP        2014-533544 A    12/2014

*Primary Examiner* — Reginald Alexander
(74) *Attorney, Agent, or Firm* — Brinks Gilson & Lione

(57) ABSTRACT

A stirring body of the present invention includes housing rotatably mounted to a center of a bottom surface of a cooking container, and blade that extends from an outer peripheral surface of housing toward an inner peripheral surface of the cooking container and curves convexly toward a downstream side of a rotating direction in a plan view. Blade has front edge positioned on the downstream side in the rotating direction, and rear edge positioned on an upstream side in the rotating direction relative to front edge. A leading end portion of blade curves along the inner peripheral surface of the cooking container in the plan view and slopes upward toward the upstream side in the rotating direction. Front edge is positioned below rear edge near housing and is positioned above rear edge near leading end portion.

11 Claims, 18 Drawing Sheets

(51) Int. Cl.
*A47J 43/046* (2006.01)
*A47J 36/16* (2006.01)

(58) Field of Classification Search
USPC .................. 99/348, 409; 366/248, 249, 273
See application file for complete search history.

(56) References Cited

U.S. PATENT DOCUMENTS

| | | | | |
|---|---|---|---|---|
| 6,026,735 | A * | 2/2000 | Waterworth | A47J 27/002 366/146 |
| 6,289,793 | B1 * | 9/2001 | Hu | A47J 27/004 366/145 |
| 8,430,024 | B2 * | 4/2013 | Chang | A47J 37/00 99/348 |
| 2010/0028514 | A1 | 2/2010 | Goderiaux et al. | |
| 2011/0293807 | A1 * | 12/2011 | Dushine | A23L 2/39 426/519 |
| 2014/0290499 | A1 | 10/2014 | Murbacher et al. | |

* cited by examiner

HEATING COOKER

This application is a 371 application of PCT/JP2016/003569 having an international filing date of Aug. 3, 2016, which claims priority to JP2015-167692 filed Aug. 27, 2015, the entire contents of which are incorporated herein by reference.

TECHNICAL FIELD

The present invention relates to a heating cooker having a stirring function that includes a stirring body configured to stir cooking materials in a cooking container.

BACKGROUND ART

Conventional heating cookers of this type are described with reference to FIGS. 15 to 17.

FIG. 15 is a perspective view of a stirring body of one of the conventional heating cookers. As shown in FIG. 15, stirring body 100 includes pushing part 101 that pushes cooking materials toward an inner peripheral surface of a cooking container, and turnover part 102 that turns over the cooking materials positioned near the inner peripheral surface of the cooking container toward a center of the cooking container while stirring body 100 rotates on rotation axis 100A inside the cooking container. Pushing part 101 is formed to curve convexly toward a downstream side in rotating direction X100 in a plan view and to reduce in height toward turnover part 102. Turnover part 102 has first slope 102A sloping upward toward an upstream side in rotating direction X100, and second slope 102B that is adjacent to first slope 102A and slopes downward from an apex of first slope 102A toward rotation axis A100 (refer to, for example, PTL 1).

FIG. 16 is a plan view of a stirring body of the other conventional heating cooker, and FIG. 17 is a side view of that stirring body. As shown in FIGS. 16 and 17, stirring body 200 includes blade 201 that curves convexly toward a downstream side in rotating direction X200 in a plan view. Blade 201 is a substantially plate-shaped member that is provided to slope upward toward an upstream side in rotating direction X200 throughout its overall length. Moreover, blade 201 is formed to reduce in height in a direction away from rotation axis A200 and to increase in height slightly at its leading end portion. In other words, blade 201 has gently sloping depression 201B that is formed closer to rotation axis A200 than its leading end portion is. Blade 201 is also provided with, at a center of its upstream side in rotating direction X200, fin 202 that extends in a direction substantially orthogonal to an extending direction of blade 201. Fin 202 is formed to be higher than an upper edge of blade 201 (refer to, for example, PTL 2).

CITATION LIST

Patent Literature

PTL 1: Japanese Patent No. 5,250,428
PTL 2: Japanese Translation of PCT Publication No. 2014-533544

SUMMARY OF THE INVENTION

In cases where the heating cooker of PTL 1 is used to cook relatively large cooking materials such as materials for french fries, such cooking materials are generally pushed toward the inner peripheral surface of the cooking container by pushing part 101 along with the rotation of stirring body 100 in rotating direction X100. The cooking materials pushed toward the inner peripheral surface of the cooking container go up to the apex of first slope 102A of turnover part 102 along first slope 102A as a result of their movement away from rotation axis A100 being restricted by the inner peripheral surface and fall along second slope 102B toward rotation axis A100. Here, turning force acts on these cooking materials, so that these cooking materials turn over. As a result, uneven heating is conceivably reduced.

On the other hand, in cases where the heating cooker of PTL 1 is used to cook relatively small cooking materials such as minced onions, such cooking materials generally move in a manner similar to the large cooking materials in an initial stage of heating. In other words, these cooking materials move along pushing part 101, first slope 102A and then second slope 102B, thereby turning over.

However, as the heating proceeds, these cooking materials start to release moisture. This is when the cooking materials adhere easily to stirring body 100, and resistance from a bottom surface of the cooking container reduces. For this reason, it becomes difficult for pushing part 101 to move these cooking materials toward the inner peripheral surface of the cooking container, and it also becomes difficult for the cooking materials to go up first slope 102A of turnover part 102. Moreover, first slope 102A is provided to be parallel to a radial direction and thus does not have such a component as to direct the cooking materials toward rotation axis A100. For this reason, first slope 102A serves as a dam and thus easily causes the cooking materials to rotate together with stirring body 100. As a result, the same area of the cooking materials is continuously heated, thus resulting in uneven heating.

In cases where the heating cooker of PTL 2 is used to cook relatively small cooking materials such as minced onions, such cooking materials are generally pushed toward an inner peripheral surface of a cooking container by blade 201. The cooking materials pushed toward the inner peripheral surface of the cooking container move in such a manner as to climb over depression 201B because depression 201B is low-profile. This phenomenon takes place not only in an initial stage of heating but also in a later stage of heating because when the cooking materials increase in number near the inner peripheral surface of the cooking container, the cooking materials can climb over depression 201B with ease. Consequently, the cooking materials are restrained from rotating together with stirring body 200.

On the other hand, in cases where the heating cooker of PTL 2 is used to cook relatively large cooking materials such as materials for french fries, some of the cooking materials go up blade 201, come into contact with fin 202 and get over blade 201. Here, turning force acts on those cooking materials, so that those cooking materials turn over. However, many of the cooking materials are generally pushed toward the inner peripheral surface of the cooking container by blade 201 and make such a movement as to climb over depression 201B as in the case of the small cooking materials. In this case, weaker turning force acts on the cooking materials because depression 201B is low-profile, so that it is difficult to turn over the cooking materials. As a result, the same area of the cooking materials is continuously heated, thus resulting in uneven heating.

Therefore, there is still room for improvement in each of the heating cookers disclosed in PTL 1 and PTL 2 in view of more uniform cooking of both the relatively small and large cooking materials.

The present invention provides a heating cooker having a stirring function that is capable of more uniform cooking of both the relatively small and large cooking materials.

A heating cooker having a stirring function according to the present invention includes a stirring body that is configured to stir cooking materials housed in a cooking container. The stirring body includes a housing rotatably mounted to a center of a bottom surface of the cooking container, and a blade that extends from an outer peripheral surface of the housing toward an inner peripheral surface of the cooking container and curves convexly toward a downstream side in a rotating direction of the housing in a plan view. The blade has a front edge positioned on the downstream side in the rotating direction, and a rear edge positioned on an upstream side in the rotating direction relative to the front edge. A leading end portion of the blade curves along the inner peripheral surface of the cooking container in the plan view and slopes upward toward the upstream side in the rotating direction. The front edge is positioned below the rear edge near the housing and is positioned above the rear edge near the leading end portion.

With this structure, both the relatively small and large cooking materials can be cooked more uniformly.

DETAILED DESCRIPTION OF THE PREFERRED EMBODIMENTS

Exemplary embodiments of the present invention are described hereinafter with reference to the accompanying drawings. It is to be noted that the exemplary embodiments described hereinafter are not restrictive of the present invention.

First Exemplary Embodiment

Figure 1:
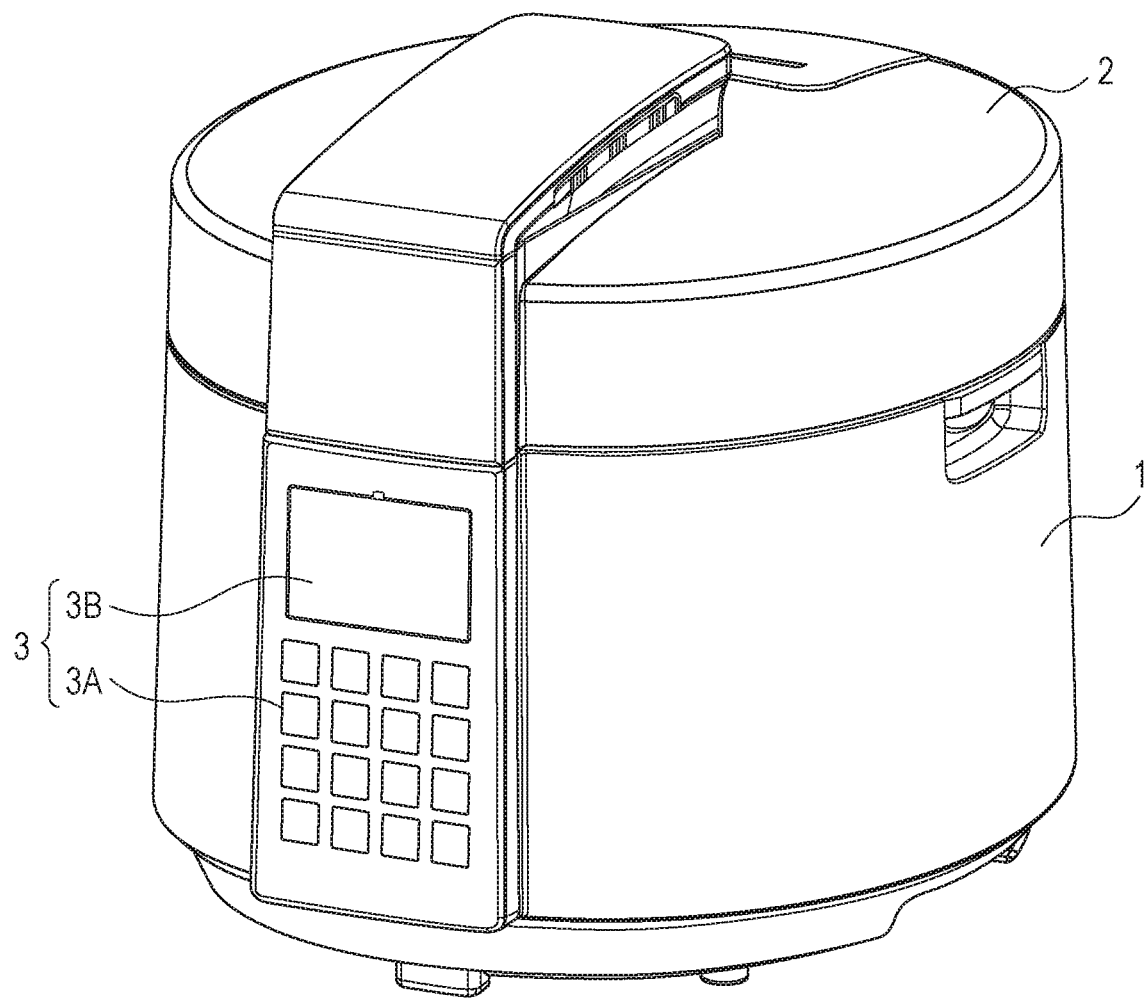
FIG. 1 is a perspective view of a heating cooker according to a first exemplary embodiment of the present invention.
Figure 2:
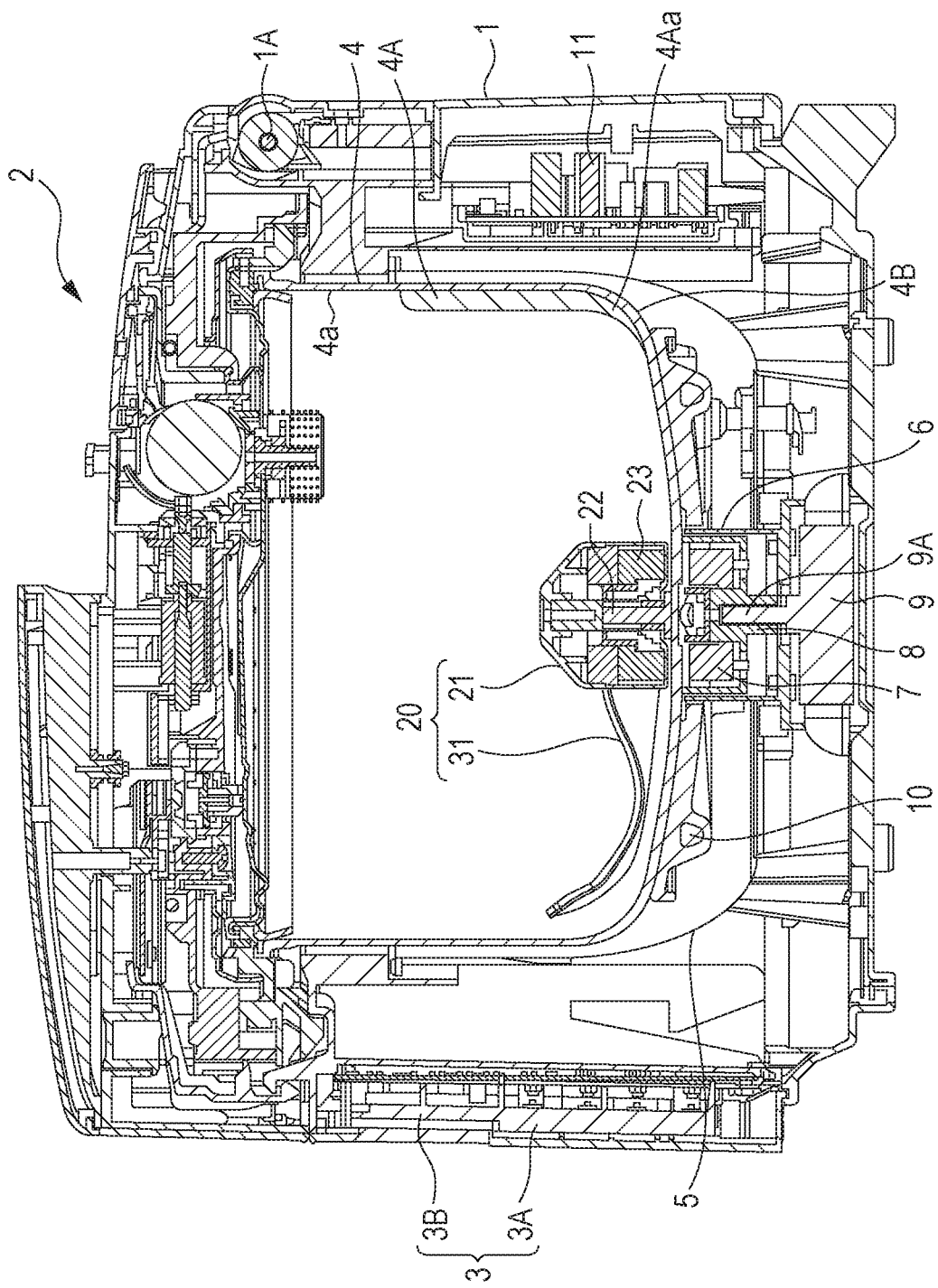
FIG. 2 is a sectional view of the heating cooker according to the first exemplary embodiment of the present invention.

A heating cooker according to the first exemplary embodiment of the present invention is a heating cooker having a stirring function that includes a stirring body configured to stir cooking materials housed in a cooking container. FIG. 1 is a perspective view of the heating cooker according to the present exemplary embodiment. FIG. 2 is a sectional view of the heating cooker according to the present exemplary embodiment.

As shown in FIG. 1, the heating cooker of the present exemplary embodiment includes apparatus body 1 having a substantially bottomed cylindrical shape, and lid 2 that openably covers an upper opening of apparatus body 1. As shown in FIG. 2, lid 2 is rotatably mounted to hinge part 1A provided at an upper rear part (upper right in FIG. 2) of apparatus body 1.

Apparatus body 1 has, at its front, operation unit 3 provided for various operations including selection of a cooking menu. Operation unit 3 includes operation key group 3A and display 3B. Operation key group 3A includes, for example, a start key, a cancel key, and a select key used for, for example, selecting the cooking menu. Display 3B is formed of, for example, a liquid crystal display panel and displays various pieces of information such as information set by means of the operation key group.

As shown in FIG. 2, storage part 5 having a bottomed cylindrical shape is provided inside apparatus body 1 to receive detachable cooking container 4. Substantially cylindrical motor holder 6 is provided at a bottom center of storage part 5 in such a manner as to partly pass through the bottom center of storage part 5. Ring-shaped driving magnet 7 and magnet holder 8 for holding driving magnet 7 are provided inside motor holder 6. Motor 9 that generates rotational driving force has its drive shaft 9A inserted into a center of magnet holder 8. Motor 9 is provided externally of storage part 5 and is held by the motor holder. As motor 9 is driven, drive shaft 9A rotates on its axis, and magnet holder 8 and driving magnet 7 rotate accordingly.

Heater 10 is provided externally of motor holder 6 and at an inner bottom of storage part 5 for heating cooking container 4. In the present exemplary embodiment, heater 10 is a sheathed heater that transmits heat by contact with a bottom wall of cooking container 4. Heater 10 is formed to be substantially annular and is provided in a position opposed to an outer peripheral portion of the bottom wall of cooking container 4.

Controller 11 controls driving of motor 9 and driving of heater 10. Controller 11 is disposed externally of storage part 5 but inside apparatus body 1. Based on various pieces of information set by means of operation unit 3 and through use of, for example, a temperature sensor (not illustrated) provided inside apparatus body 1, controller 11 controls driving of parts and devices including motor 9 and heater 10.

Cooking container 4 is a container capable of housing a plurality of cooking materials including relatively large cooking materials such as materials for french fries or relatively small cooking materials such as minced onions. Inside cooking container 4, stirring body 20 that stirs the cooking materials is provided.

Stirring body 20 includes housing 21 rotatably mounted to a center of a bottom surface of cooking container 4, and blade 31 extending from an outer peripheral surface of housing 21 toward inner peripheral surface 4a of cooking container 4.

Inside housing 21, there are provided shaft 22 that serves as a rotating shaft, and ring-shaped driven magnet 23 disposed to surround shaft 22. Driven magnet 23 and driving magnet 7 mentioned above form a magnetic coupling. Stirring body 20 is detachably mounted to the center of the bottom surface of cooking container 4 via the magnetic coupling and rotates on an axis of shaft 22 when motor 9 is driven.

Figure 3:
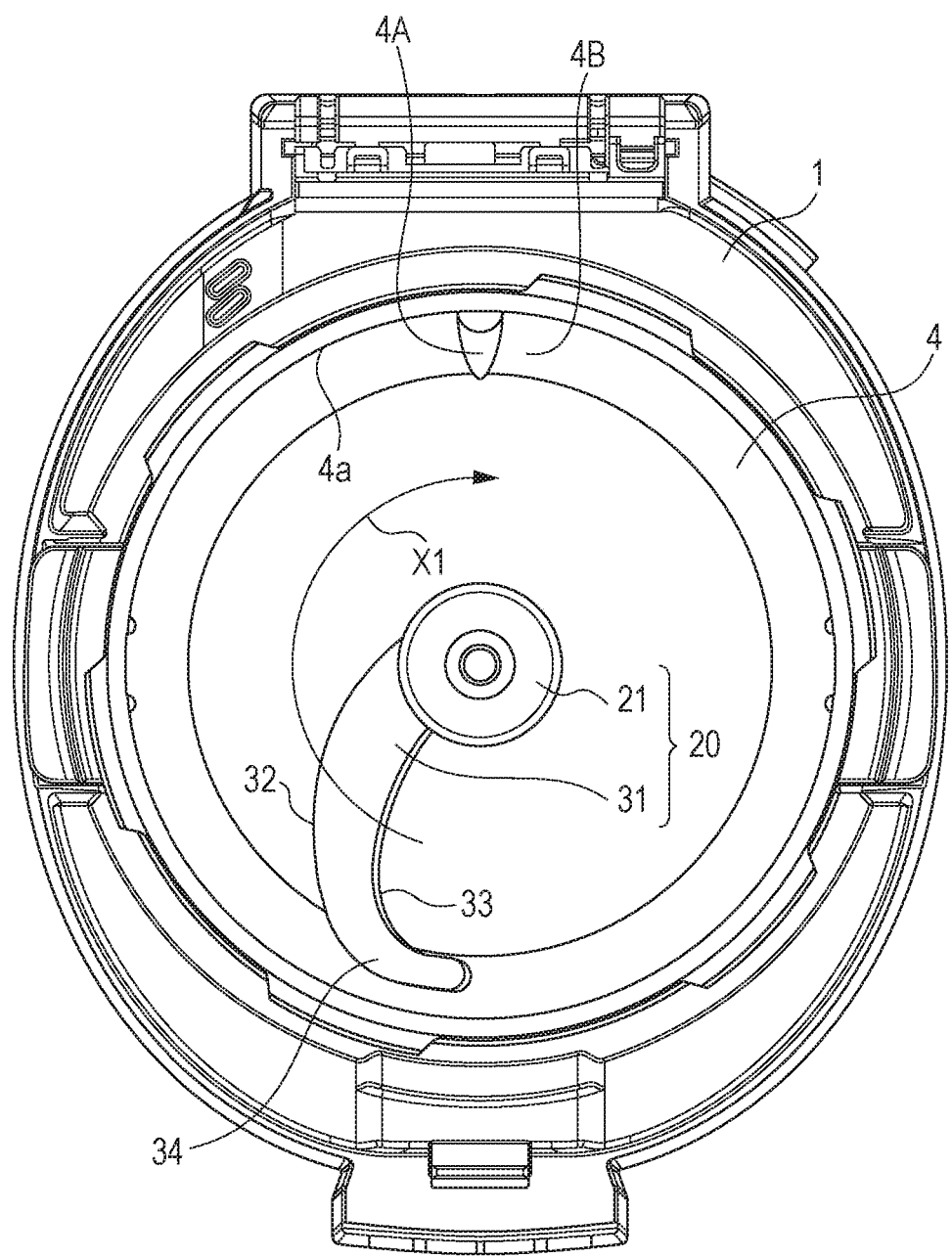
FIG. 3 is a plan view illustrating the heating cooker with a lid removed according to the first exemplary embodiment of the present invention.

FIG. 3 is a plan view illustrating the heating cooker of FIG. 1 with lid 2 removed therefrom. As shown in FIG. 3, blade 31 of stirring body 20 is formed to curve convexly toward a downstream side in rotating direction X1 of housing 21 in the plan view. Blade 31 has front edge 32 positioned on the downstream side in rotating direction X1, and rear edge 33 positioned on an upstream side in rotating direction X1 relative to front edge 32. Leading end portion 34 of blade 31 is formed to curve along inner peripheral surface 4a of cooking container 4 in the plan view. It is to be noted that leading end portion 34 of blade 31 is not limited to a leading end portion that curves with exactly the same curvature as inner peripheral surface 4a of cooking container 4 but may curve with substantially the same curvature as inner peripheral surface 4a of cooking container 4.

Inner peripheral surface 4a of cooking container 4 is provided with obstacle 4A that extends in an up-and-down direction and projects toward a center of cooking container 4. Leading end portion 34 of blade 31 is spaced a predetermined clearance away from inner peripheral surface 4a of cooking container 4 so as not to come into contact with obstacle 4A during rotation around the axis of shaft 22. A detailed description of obstacle 4A will be given later.

Figure 4:
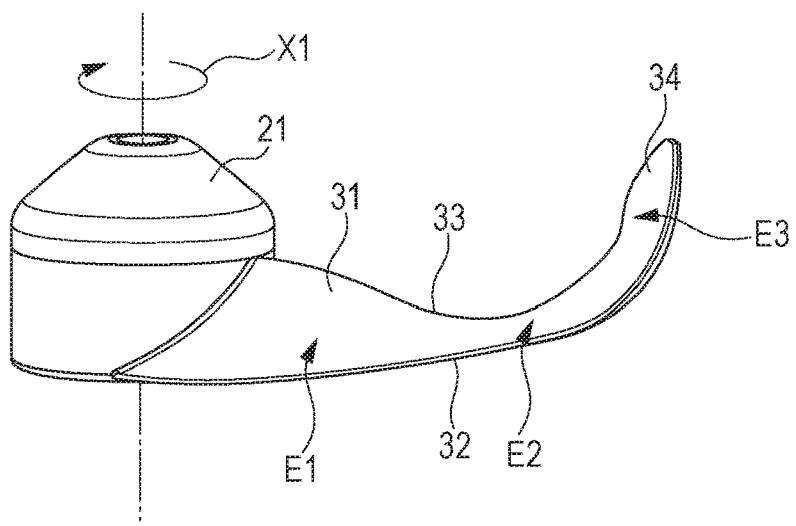
FIG. 4 is a perspective view of a stirring body of the heating cooker according to the first exemplary embodiment of the present invention.
Figure 5:
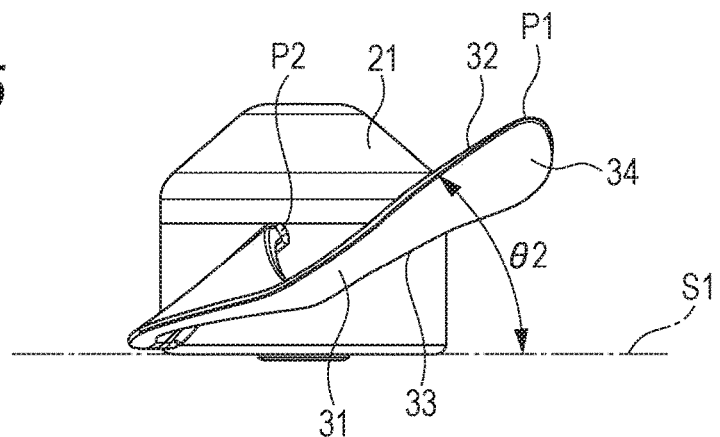
FIG. 5 is a side view of the stirring body of the heating cooker according to the first exemplary embodiment of the present invention.
Figure 6:
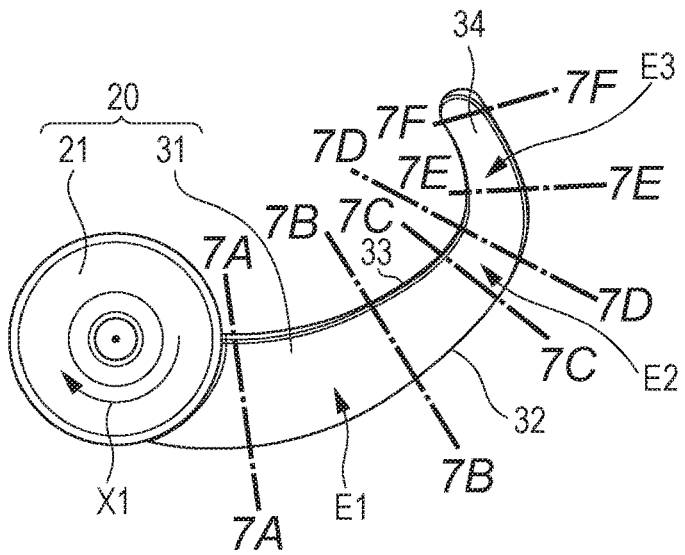
FIG. 6 is a plan view of the stirring body of the heating cooker according to the first exemplary embodiment of the present invention.
Figure 7A:
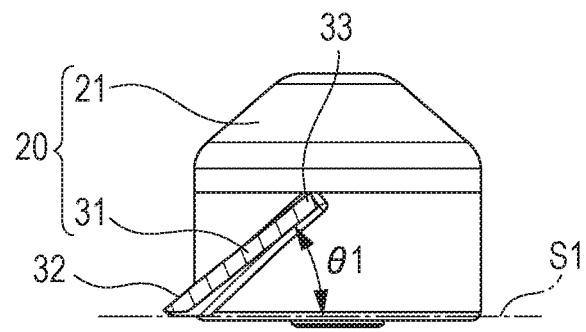
FIG. 7A is a sectional view taken along 7A-7A of FIG. 6.
Figure 7B:
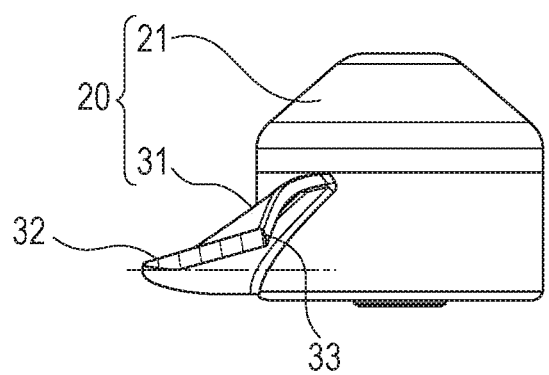
FIG. 7B is a sectional view taken along 7B-7B of FIG. 6.
Figure 7C:
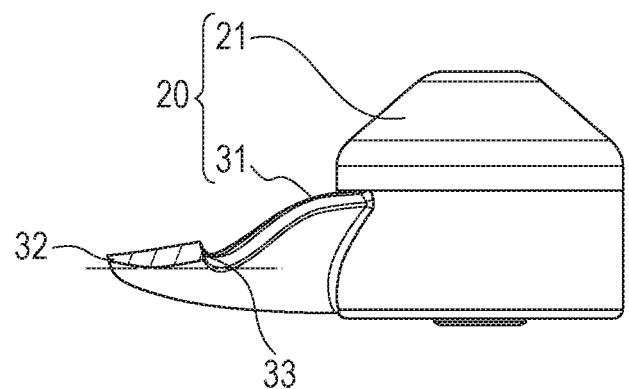
FIG. 7C is a sectional view taken along 7C-7C of FIG. 6.
Figure 7D:
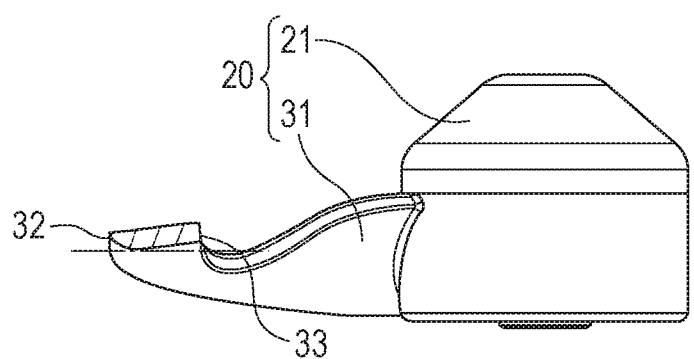
FIG. 7D is a sectional view taken along 7D-7D of FIG. 6.
Figure 7E:
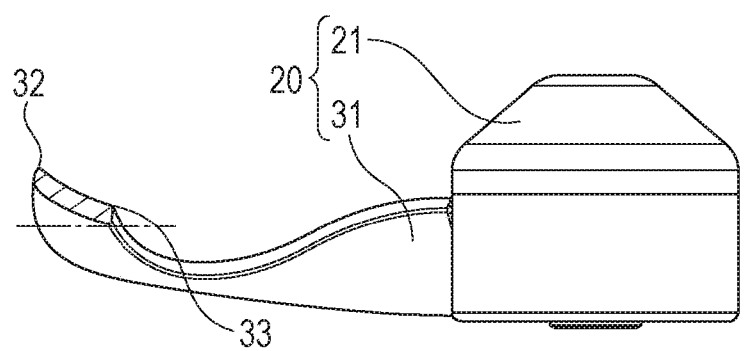
FIG. 7E is a sectional view taken along 7E-7E of FIG. 6.
Figure 7F:
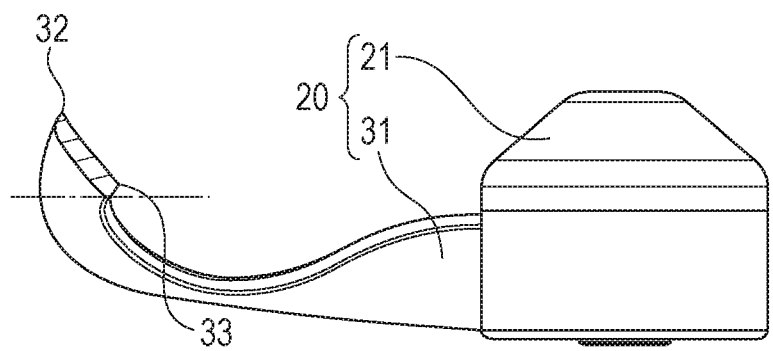
FIG. 7F is a sectional view taken along 7F-7F of FIG. 6.

FIG. 4 is a perspective view of stirring body 20, and FIG. 5 is a side view of stirring body 20. FIG. 6 is a plan view of stirring body 20. FIG. 7A is a sectional view taken along 7A-7A of FIG. 6, FIG. 7B is a sectional view taken along 7B-7B of FIG. 6, and FIG. 7C is a sectional view taken along 7C-7C of FIG. 6. FIG. 7D is a sectional view taken along 7D-7D of FIG. 6, FIG. 7E is a sectional view taken along 7E-7E of FIG. 6, and FIG. 7F is a sectional view taken along 7F-7F of FIG. 6.

As shown FIGS. 3 to 7F, blade 31 is formed by twisting one plate member in the present exemplary embodiment. Front edge 32 of blade 31 is positioned below rear edge 33 near housing 21. In other words, blade 31 is formed to slope upward toward an upstream side in rotating direction X1 near housing 21. A portion of blade 31 that is near housing 21 functions to push the cooking materials toward inner peripheral surface 4a of cooking container 4 along with the rotation of blade 31. In the present exemplary embodiment, a functional region of blade 31 that includes this portion near housing 21 is referred to as "first stirring region E1".

It is to be noted that when a junction between blade 31 and housing 21 is inclined at angle θ1 of not less than 50° with respect to plane S1 parallel to rotating direction X1 as shown in FIG. 7A, small cooking materials having moist surfaces adhere to first stirring region E1 of blade 31, therefore, stirring force toward inner peripheral surface 4a of cooking container 4 is reduced. On the other hand, when inclined angle θ1 is not more than 10°, large cooking materials climb over first stirring region E1 of blade 31 with ease, thus resulting in reduced stirring force in the direction toward inner peripheral surface 4a of cooking container 4. For the above reason, inclined angle θ1 preferably ranges from 20° to 40°, and it is more preferable that inclined angle θ1 ranges from 30° to 40°.

Blade 31 is formed so that a height of rear edge 33 reduces in a direction away from the outer peripheral surface of housing 21 and front edge 32 and rear edge 33 are formed to be positioned at an identical height or substantially identical height near inner peripheral surface 4a of cooking container 4 as shown in FIGS. 7C and 7D. A portion of blade 31 that is near inner peripheral surface 4a of cooking container 4 functions to allow the cooking materials to climb over blade 31 along with the rotation of blade 31. In the present exemplary embodiment, the region having such a function is referred to as "second stirring region E2".

As shown in FIGS. 4 and 5, leading end portion 34 of blade 31 is formed to slope upward toward the upstream side in rotating direction X1. Along with the rotation of blade 31, leading end portion 34 of blade 31 functions to bring up cooking materials accumulating near inner peripheral surface 4a of cooking container 4 and turn over the cooking materials when the cooking materials fall. In the present exemplary embodiment, the region having such a function is referred to as "third stirring region E3".

It is to be noted that when front edge 32 is inclined at leading end portion 34 of blade 31 at angle θ2 of not more than 20° with respect to plane S1 parallel to rotating direction X1 as shown in FIG. 5, large cooking materials are difficult to turn over. On the other hand, when inclined angle θ2 is not less than 60°, leading end portion 34 of blade 31 serves as a dam and thus easily causes small cooking materials to rotate together with blade 31. As a result, the same area of the cooking materials is continuously heated, thus resulting in uneven heating. In this case, torque for rotation of blade 31 also needs to be increased. For the above reason, inclined angle θ2 preferably ranges from 30° to 50°, and it is more preferable that inclined angle θ2 ranges from 30° to 40°.

As shown in FIGS. 7E and 7F, rear edge 33 is positioned to be below front edge 32 and to be closer to housing 21 than front edge 32 is near leading end portion 34 of blade 31. In other words, front edge 32 is positioned above rear edge 33 near leading end portion 34 of blade 31. This means that leading end portion 34 of blade 31 is formed to slope downward toward housing 21. Thus, the cooking materials that go up leading end portion 34 of blade 31 along with the rotation of blade 31 fall easily toward housing 21 (toward an upstream side of second stirring region E2 in rotating direction X1). Consequently, with leading end portion 34 of blade 31 prevented from becoming a dam, a flow that causes the cooking materials to climb over second stirring region E2 and third stirring region E3 of blade 31 while turning over can be generated, thus enabling more uniform heating of the cooking materials. With leading end portion 34 of blade 31 sloping downward toward housing 21, a direction of drag on the cooking materials at leading end portion 34 is a direction inclined toward a rotation center relative to a tangential direction of rotation. For this reason, reaction force has a smaller component in the tangential direction of rotation, so that a load of the cooking materials on blade 31 can be reduced, and the torque for rotation of blade 31 can be reduced accordingly.

As shown in FIG. 5, upper end P1 of leading end portion 34 of blade 31 is positioned above upper end P2 of the junction between blade 31 and housing 21. Accordingly, the cooking materials that go up leading end portion 34 of blade 31 along with the rotation of blade 31 can have increased potential energy and thus can be turned over more reliably.

As shown in FIG. 6 and FIGS. 7A to 7F, a shortest distance between front edge 32 and rear edge 33 in a cross section taken along rotating direction X1 shortens toward leading end portion 34 in a plan view. Accordingly, the load of the cooking materials on blade 31 can be reduced, and thus the torque for rotation of blade 31 can be reduced.

A description will be given next of a stirring operation of stirring body 20 performed on the cooking materials.

Figure 8A:
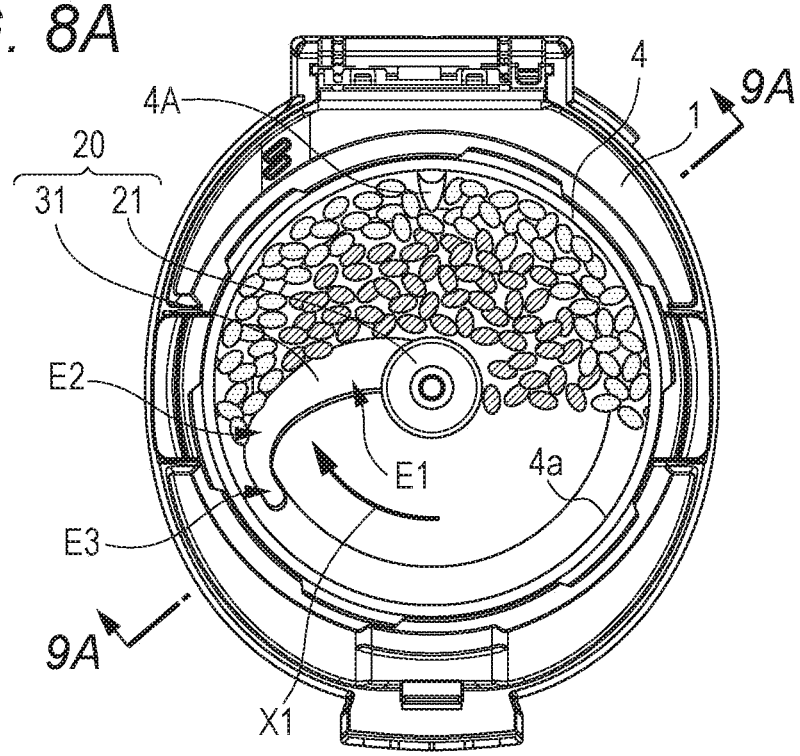
FIG. 8A is a plan view illustrating the stirring body stirring cooking materials in the heating cooker according to the first exemplary embodiment of the present invention.
Figure 8B:
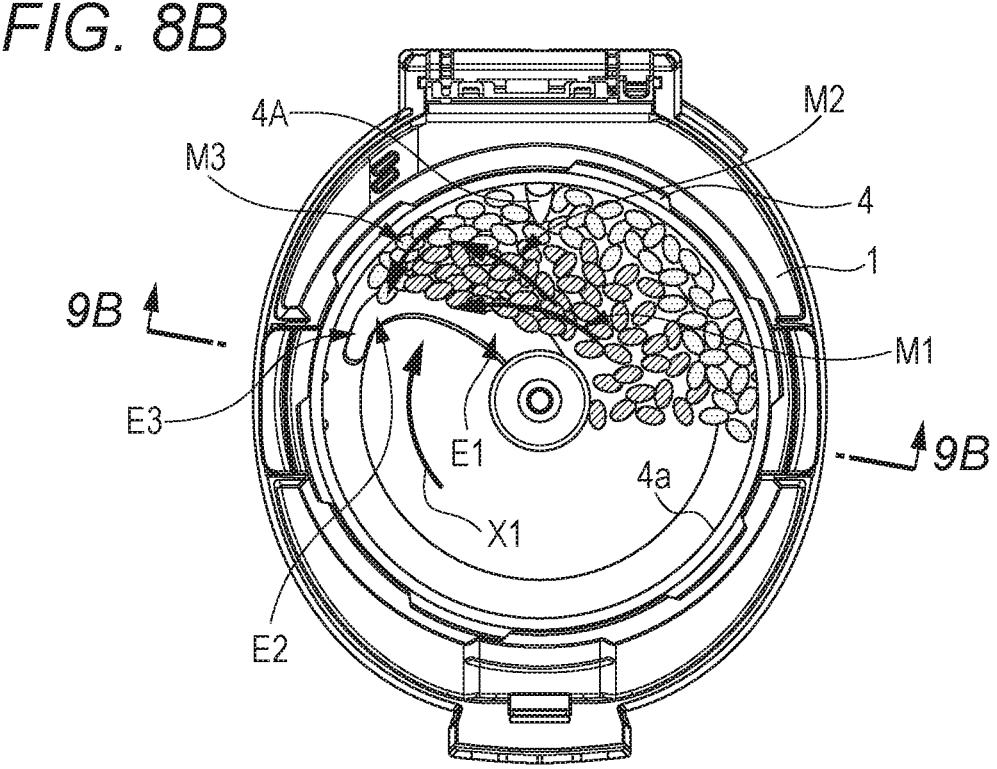
FIG. 8B is a plan view illustrating the stirring body stirring the cooking materials in the heating cooker according to the first exemplary embodiment of the present invention.
Figure 8C:
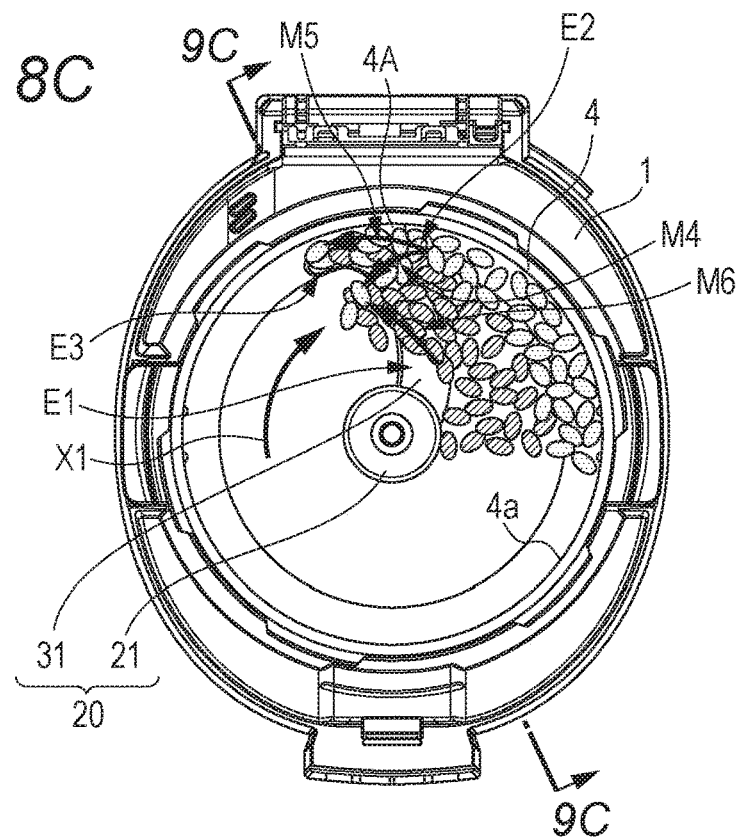
FIG. 8C is a plan view illustrating the stirring body stirring the cooking materials in the heating cooker according to the first exemplary embodiment of the present invention.
Figure 8D:
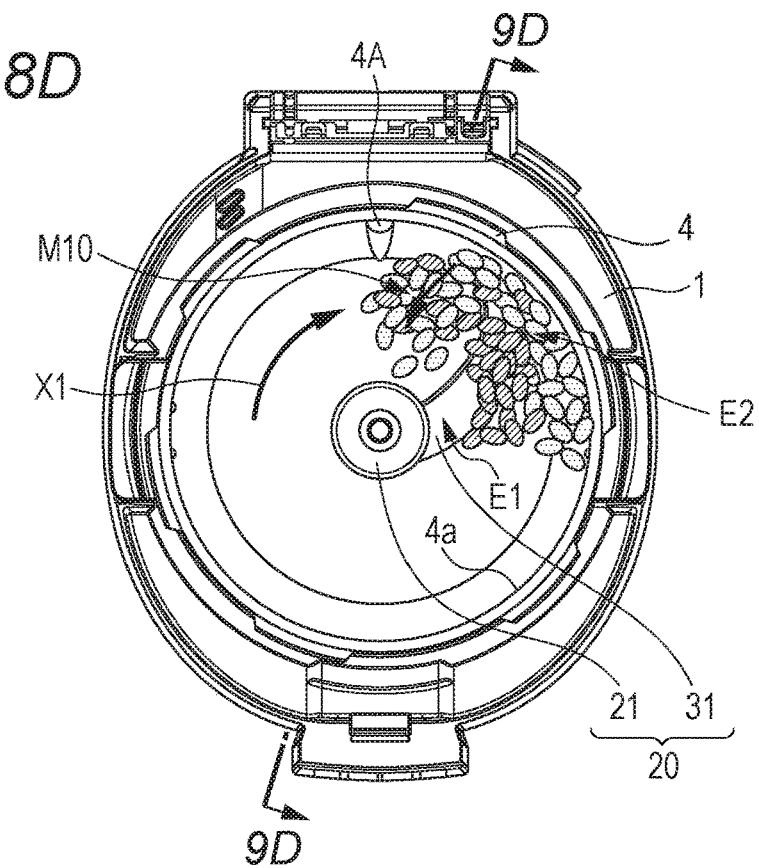
FIG. 8D is a plan view illustrating the stirring body stirring the cooking materials in the heating cooker according to the first exemplary embodiment of the present invention.
Figure 9A:
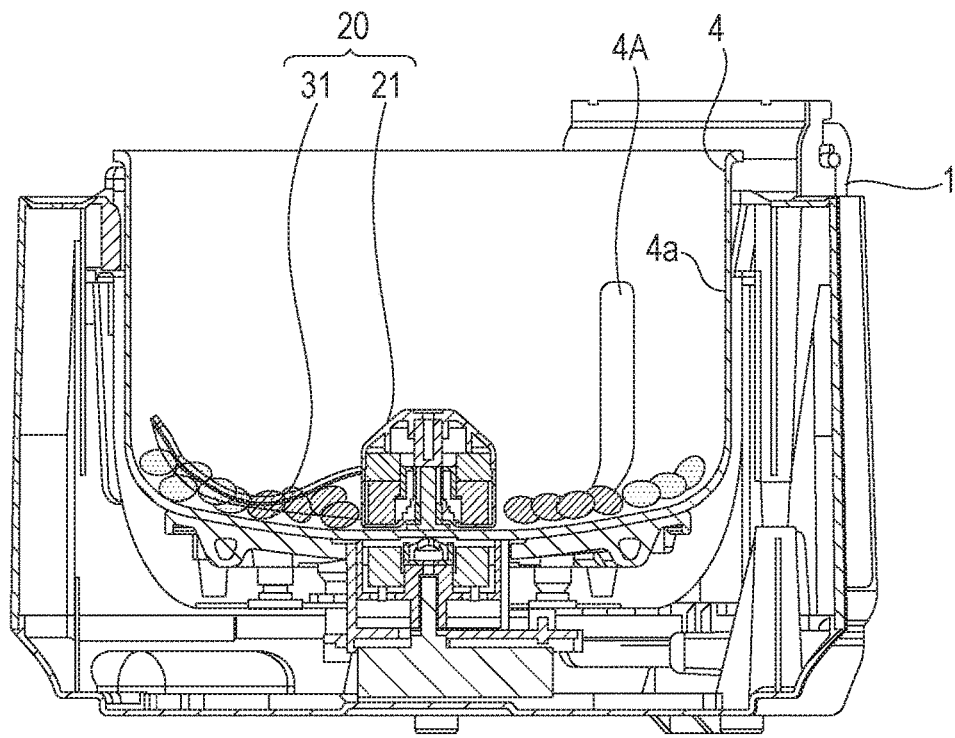
FIG. 9A is a sectional view taken along 9A-9A of FIG. 8A.

FIGS. 8A to 8D are plan views each illustrating stirring body 20 stirring the cooking materials. FIG. 9A is a sectional view taken along 9A-9A of FIG. 8A, FIG. 9B is a sectional view taken along 9B-9B of FIG. 8B, FIG. 9C is a sectional view taken along 9C-9C of FIG. 8C, and FIG. 9D is a sectional view taken along 9D-9D of FIG. 8D.

The following description refers to a case where relatively small materials such as minced onions are cooked.

First, motor 9 is driven to transmit its rotational force to stirring body 20 via the magnetic coupling formed by driving magnet 7 and driven magnet 23, thus stirring body 20 rotates in rotating direction X1. Accordingly, blade 31 of stirring body 20 comes into contact with the cooking materials as shown in FIGS. 8A and 9A.

Figure 9B:
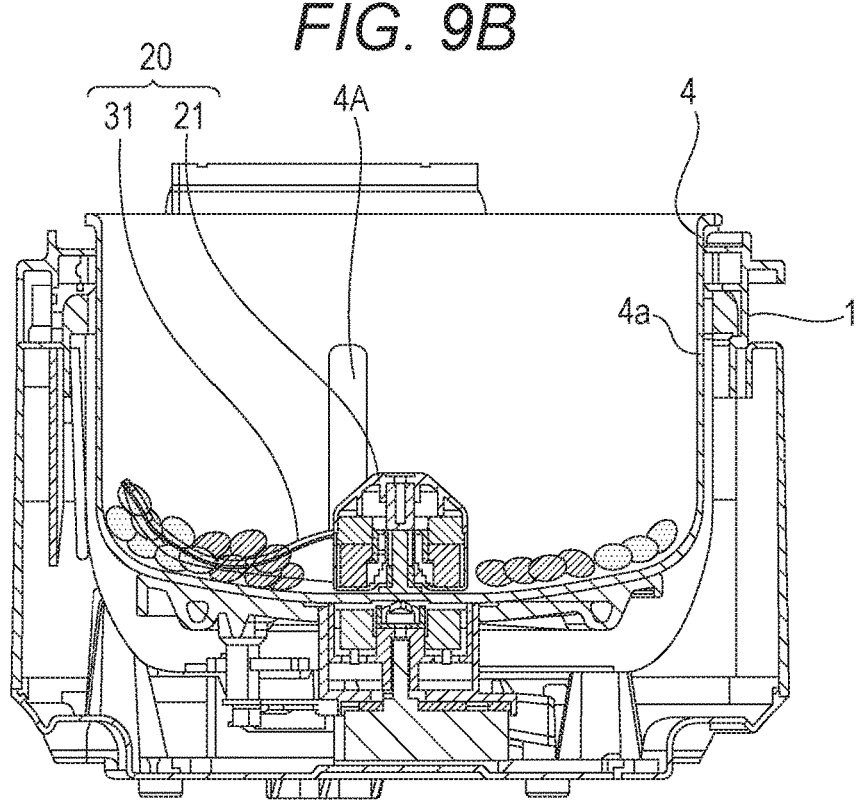
FIG. 9B is a sectional view taken along 9B-9B of FIG. 8B.
Figure 9C:
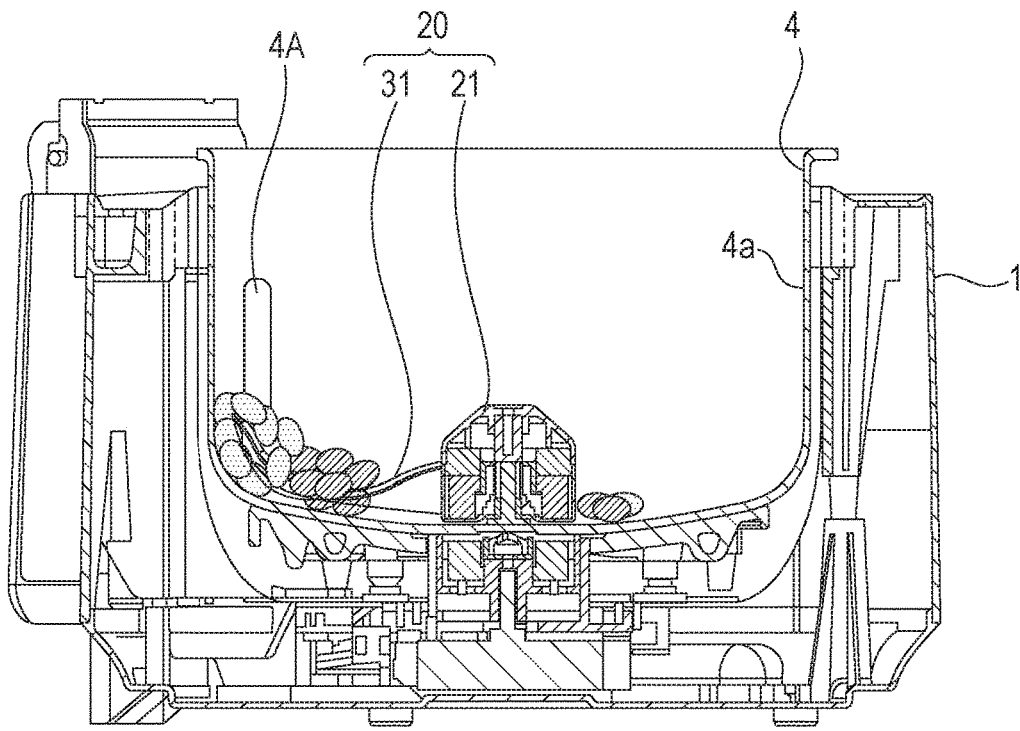
FIG. 9C is a sectional view taken along 9C-9C of FIG. 8C.
Figure 9D:
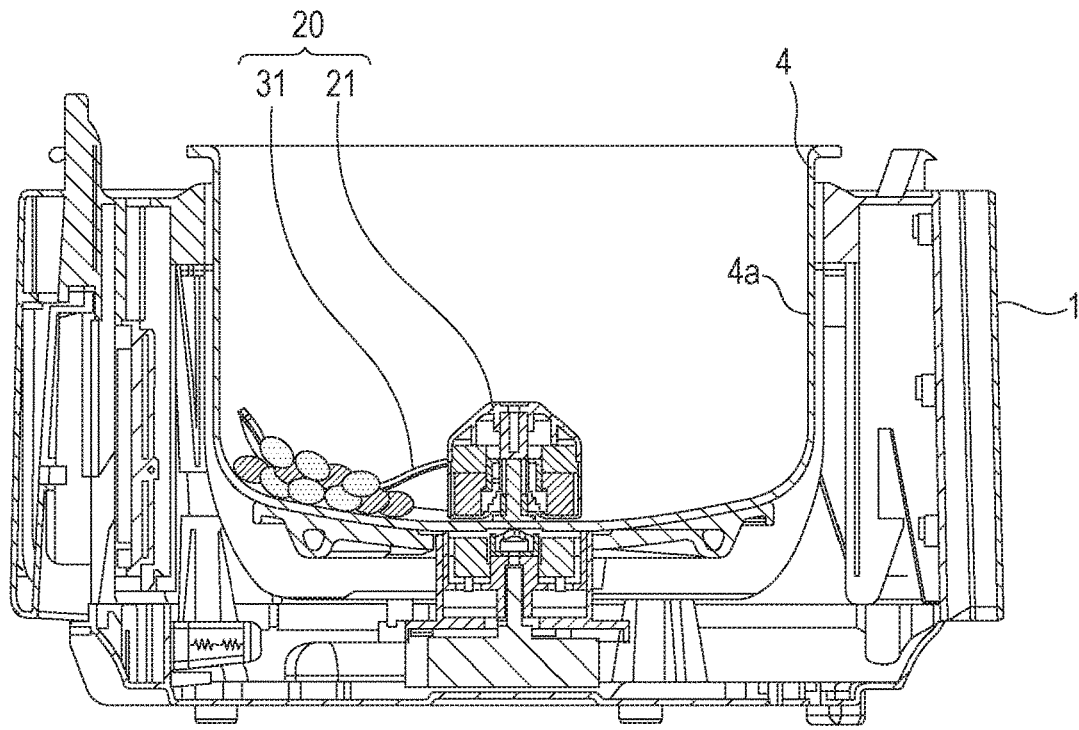
FIG. 9D is a sectional view taken along 9D-9D of FIG. 8D.

As stirring body 20 rotates further in rotating direction X1, first stirring region E1 pushes cooking materials that are near housing 21 (i.e., cooking materials hatched by oblique lines in FIGS. 8A to 8D and FIGS. 9A to 9D) toward inner peripheral surface 4a of cooking container 4 as shown in FIGS. 8B and 9B. Thus, there are present cooking materials that move along a direction of arrow M2 in which front edge 32 of blade 31 is defined and cooking materials that move in a direction of arrow M1 in such a manner as to ride on first stirring region E1. Here, cooking materials that are near second stirring region E2 (i.e., cooking materials provided with a sand hatch pattern in FIGS. 8A to 8D and FIGS. 9A to 9D) are pushed by the cooking materials moving in the direction of arrow M2 and have their movement away from housing 21 restricted by inner peripheral surface 4a of cooking container 4, thereby moving in a direction of arrow M3 in such a manner as to ride on second stirring region E2. It is to be noted here that because second stirring region E2 is at a low height, both the large and small cooking materials can ride on second stirring region E2 with ease.

Thereafter, as stirring body 20 rotates further in rotating direction X1, some of the cooking materials riding on second stirring region E2 after being pushed toward inner peripheral surface 4a of the cooking container go up in a direction of arrow M5 and ride on third stirring region E3 as shown in FIGS. 8C and 9C. A remainder of these cooking materials climbs over second stirring region E2 in a direction of arrow M4 and fall in the direction of arrow M4 from an upstream side of blade 31 in rotating direction X1. Moreover, some of the cooking materials riding on first stirring region E1 are caused by following cooking materials that move from housing 21 to ride on first stirring region E1 to fall from the rear edge where first stirring region E1 is somewhat lower in height. A remainder of those cooking materials is caused by following cooking materials that move from housing 21 to ride on first stirring region E1 to climb over second stirring region E2 in a direction of arrow M6 and fall toward the upstream side in rotating direction X1.

Thereafter, as stirring body 20 rotates further in rotating direction X1, the cooking materials that has gone up third stirring region E3 and approached a top of third stirring region E3 fall in a direction of arrow M10 from the upstream side of blade 31 in rotating direction X1 as shown in FIGS. 8D and 9D. This is when strong turning force effected by the increased potential energy acts on the cooking materials climbing over third stirring region E3, thus these cooking materials turn over easily. For this reason, whether cooking materials are large or small, the cooking materials can be turned over.

By the operation described above, the cooking materials that are near housing 21 before the rotation of stirring body 20 (i.e., the cooking materials hatched by the oblique lines in FIGS. 8A and 9A) and the cooking materials that are near second stirring region E2 before the rotation of stirring body 20 (i.e., the cooking materials provided with the sand hatch pattern in FIGS. 8A and 9A) are mixed together as shown in FIGS. 8D and 9D and stirred. Accordingly, the cooking materials are heated uniformly by heater 10 via cooking container 4.

While stirring body 20 is rotated in rotating direction X1, the motions shown in FIGS. 8A to 8D and FIGS. 9A to 9D are repeated. In this way, the cooking materials are stirred more uniformly.

The detailed description of obstacle 4A provided on inner peripheral surface 4a of cooking container 4 will be given next.

Figure 10A:
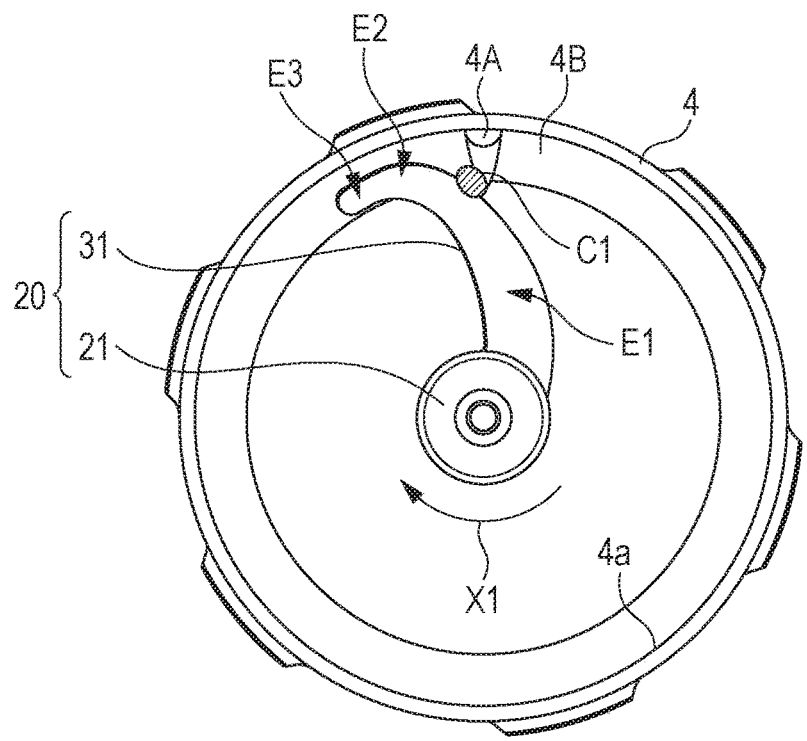
FIG. 10A is a plan view illustrating a positional relationship among the stirring body, an obstacle, and a cooking material when the stirring body stirs a cooking material in the heating cooker according to the first exemplary embodiment of the present invention.
Figure 10B:
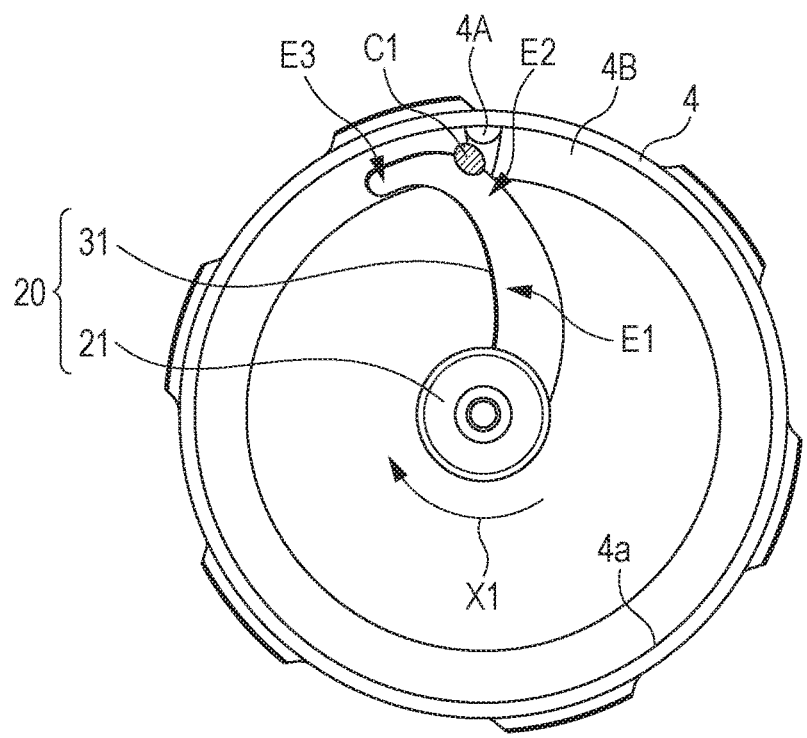
FIG. 10B is a plan view illustrating a positional relationship among the stirring body, the obstacle, and the cooking material when the stirring body stirs the cooking material in the heating cooker according to the first exemplary embodiment of the present invention.
Figure 10C:
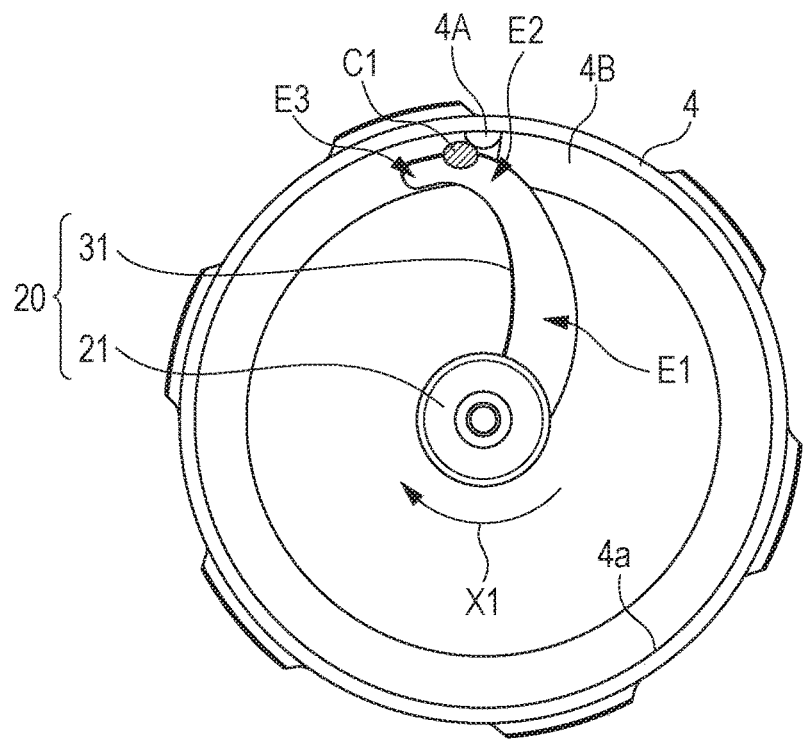
FIG. 10C is a plan view illustrating a positional relationship among the stirring body, the obstacle, and the cooking material when the stirring body stirs the cooking material in the heating cooker according to the first exemplary embodiment of the present invention.

FIGS. 10A to 10D are plan views each illustrating a positional relationship among stirring body 20, obstacle 4A and a cooking material when stirring body 20 stirs the cooking material. FIG. 11A is a perspective view, partly in section, of the positional relationship of FIG. 10A, FIG. 11B is a perspective view, partly in section, of the positional relationship of FIG. 10B, FIG. 11C is a perspective view, partly in section, of the positional relationship of FIG. 10C, and FIG. 11D is a perspective view, partly in section, of the positional relationship of FIG. 10D.

As shown in FIGS. 2 and 11A, obstacle 4A is provided to extend in an up-and-down direction and to project from inner peripheral surface 4a of cooking container 4 toward the center of cooking container 4. An amount of projection of obstacle 4A toward the center of cooking container 4 is, for example, 6 mm. Obstacle 4A is, for example, semicircular in horizontal section.

Lower end portion 4Aa of obstacle 4A is formed to curve along corner part 4B between the bottom surface and inner peripheral surface 4a of cooking container 4. A starting end of lower end portion 4Aa of obstacle 4A is positioned on the bottom surface of cooking container 4. Thus, a triangular area defined by blade 31 and an end face of obstacle 4A moves upward along with the rotation of blade 31.

First, motor 9 is driven to transmit its rotational force to stirring body 20 via the magnetic coupling formed by driving magnet 7 and driven magnet 23, so that stirring body 20 rotates in rotating direction X1. Blade 31 of stirring body 20 then pushes cooking material C1 toward inner peripheral surface 4a of cooking container 4 as shown in FIGS. 10A and 11A. Here, cooking material C1 rotating together with blade 31 while failing to ride on second stirring region E2 and third stirring region E3 of blade 31 is caught between blade 31 and obstacle 4A along with rotation of blade 31.

Thereafter, as stirring body 20 rotates further in rotating direction X1, cooking material C1 is moved in such a manner as to be raised along a curve of lower end portion 4Aa of obstacle 4A as shown in FIGS. 10B and 11B as a result of the triangular area that is defined by blade 31 and the end face of obstacle 4A moving upward.

Thereafter, as stirring body 20 rotates further in rotating direction X1, cooking material C1 is pushed by third stirring region E3 of blade 31 as shown in FIGS. 10C and 11C, thus moving upward along obstacle 4A.

Figure 10D:
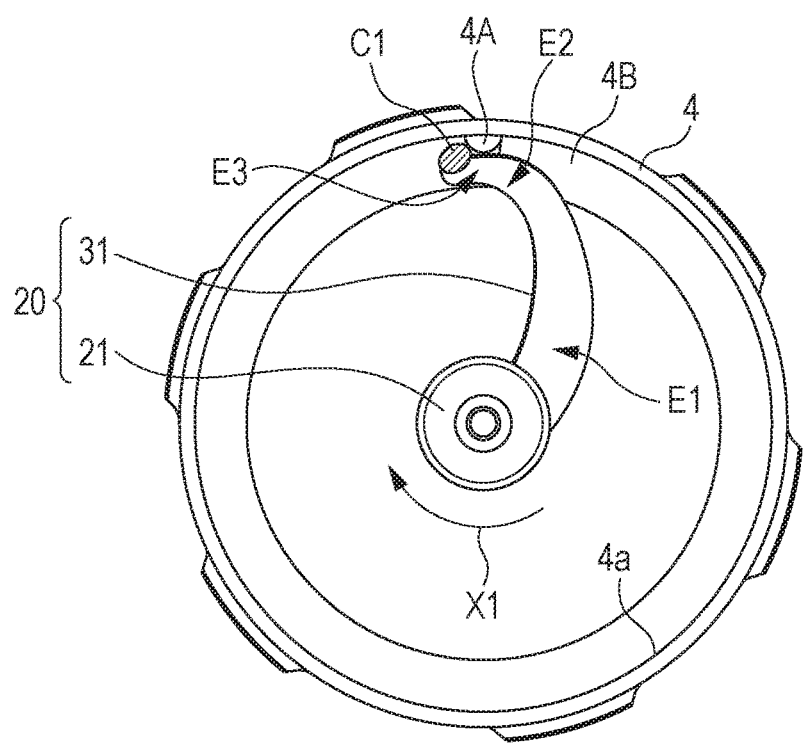
FIG. 10D is a plan view illustrating a positional relationship among the stirring body, the obstacle, and the cooking material when the stirring body stirs the cooking material in the heating cooker according to the first exemplary embodiment of the present invention.
Figure 11A:
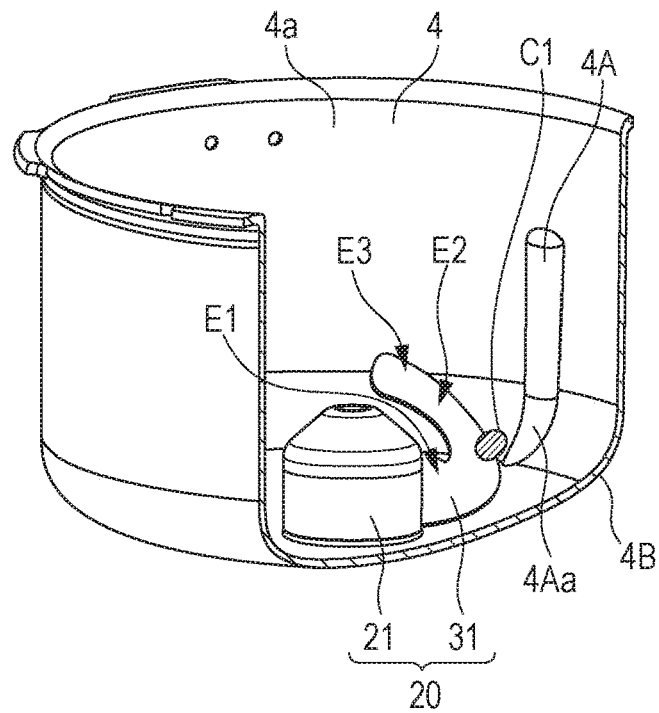
FIG. 11A is a perspective view, partly in section, of the heating cooker having the positional relationship shown in FIG. 10A according to the first exemplary embodiment of the present invention.
Figure 11B:
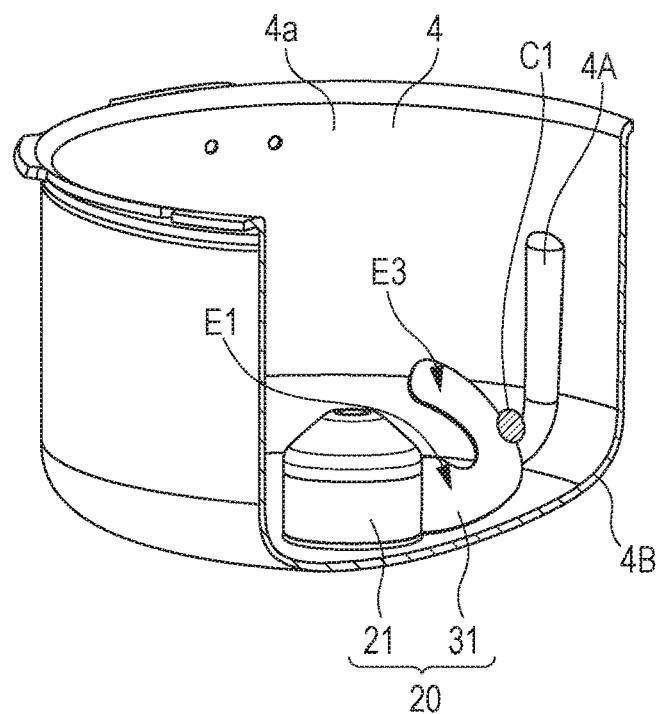
FIG. 11B is a perspective view, partly in section, of the heating cooker having the positional relationship shown in FIG. 10B according to the first exemplary embodiment of the present invention.
Figure 11C:
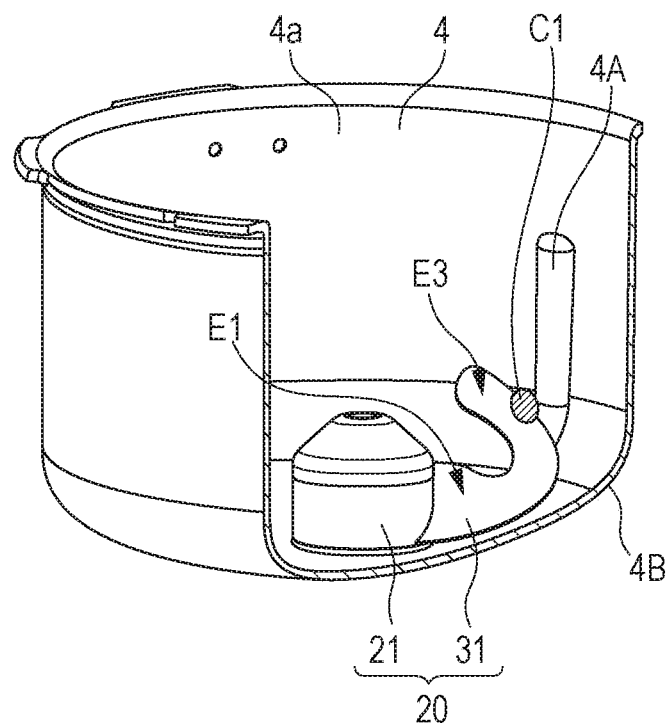
FIG. 11C is a perspective view, partly in section, of the heating cooker having the positional relationship shown in FIG. 10C according to the first exemplary embodiment of the present invention.
Figure 11D:
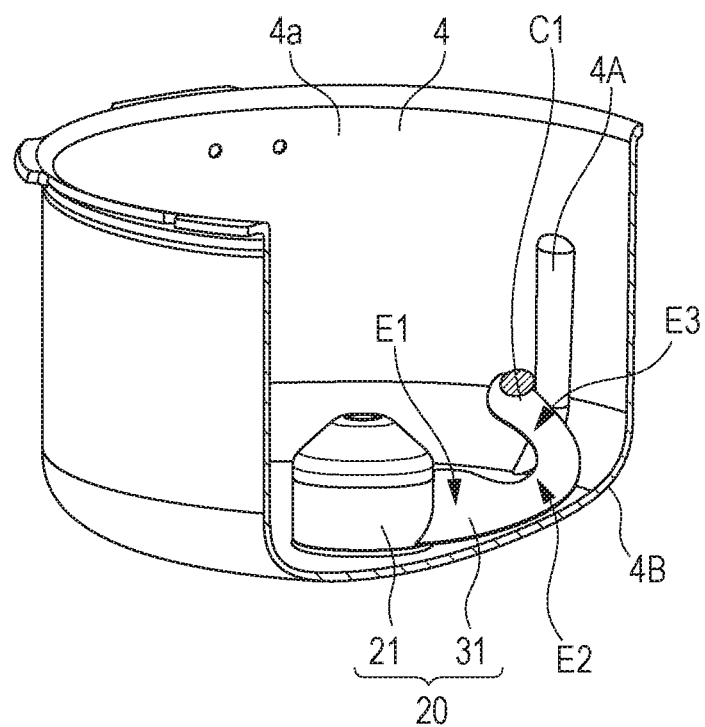
FIG. 11D is a perspective view, partly in section, of the heating cooker having the positional relationship shown in FIG. 10D according to the first exemplary embodiment of the present invention.

Thereafter, as stirring body 20 rotates further in rotating direction X1, cooking material C1 reaches the top of third stirring region E3 of blade 31 as shown in FIGS. 10D and 11D. Thereafter or in this stage, cooking material C1 climbs over third stirring region E3 or falls along a slope of third stirring region E3 that slopes toward housing 21. This is when cooking material C1 experiences turning force effected by the potential energy and thus turns over.

According to the heating cooker of the present exemplary embodiment, blade 31 is formed to curve convexly toward the downstream side in rotating direction X1 of housing 21 in a plan view and to have its front edge 32 positioned below rear edge 33 near housing 21. With this structure, the cooking materials can be moved toward inner peripheral surface 4a of cooking container 4.

According to the heating cooker of the present exemplary embodiment, leading end portion 34 of blade 31 is formed to curve along inner peripheral surface 4a of cooking container 4 in the plan view and to slope upward toward the upstream side in rotating direction X1. With this structure, the cooking materials can be turned over easily by going up leading end portion 34 of blade 31 along with the rotation of stirring body 20.

According to the heating cooker of the present exemplary embodiment, front edge 32 is formed to be positioned above rear edge 33 near leading end portion 34 of blade 31. With this structure, the cooking materials that go up leading end portion 34 of blade 31 along with the rotation of blade 31 fall easily in the direction away from inner peripheral surface 4a of cooking container 4.

As a result, both the relatively small and large cooking materials can be cooked more uniformly.

According to the heating cooker of the present exemplary embodiment, front edge 32 and rear edge 33 are formed to be positioned at an identical height or substantially identical height near inner peripheral surface 4a of cooking container 4. This structure more reliably enables the cooking materials positioned near inner peripheral surface 4a of cooking container 4 to climb over blade 31.

According to the heating cooker of the present exemplary embodiment, blade 31 is formed by twisting the one plate member. This structure does not have a complicated shape as compared with a blade of stirring body 100 of PTL 1, so that blade 31 can be formed with ease. In addition, metal can be used as material for blade 31.

According to the heating cooker of the first exemplary embodiment, obstacle 4A is provided on inner peripheral surface 4a of cooking container 4, and the lower end portion of obstacle 4A is formed to curve along corner part 4B of cooking container 4. This structure enables further reduction of a clearance between blade 31 and obstacle 4A, so that the clearance between blade 31 and inner peripheral surface 4a of cooking container 4 can be prevented from being clogged with larger cooking materials, thereby preventing the rotation of blade 31 from being stopped. It is to be noted that at least one obstacle 4A may be provided on inner peripheral surface 4a of cooking container 4.

According to the heating cooker of the present exemplary embodiment, stirring body 20 is detachably mounted to the center of the bottom surface of cooking container 4 via the magnetic coupling. This structure eliminates, for example, the need for a through hole in the bottom of cooking container 4 for passage of a shaft that serves as a rotating shaft for transmitting the rotational force to stirring body 20. Moreover, this structure enables stirring body 20 to move to such an extent that magnetic force acts to relieve a load even in cases where the clearance between blade 31 and inner peripheral surface 4a (or obstacle 4A) of cooking container 4 is clogged with the cooking materials. Thus, the rotation of blade 31 can be prevented from being stopped.

Second Exemplary Embodiment

Figure 12:
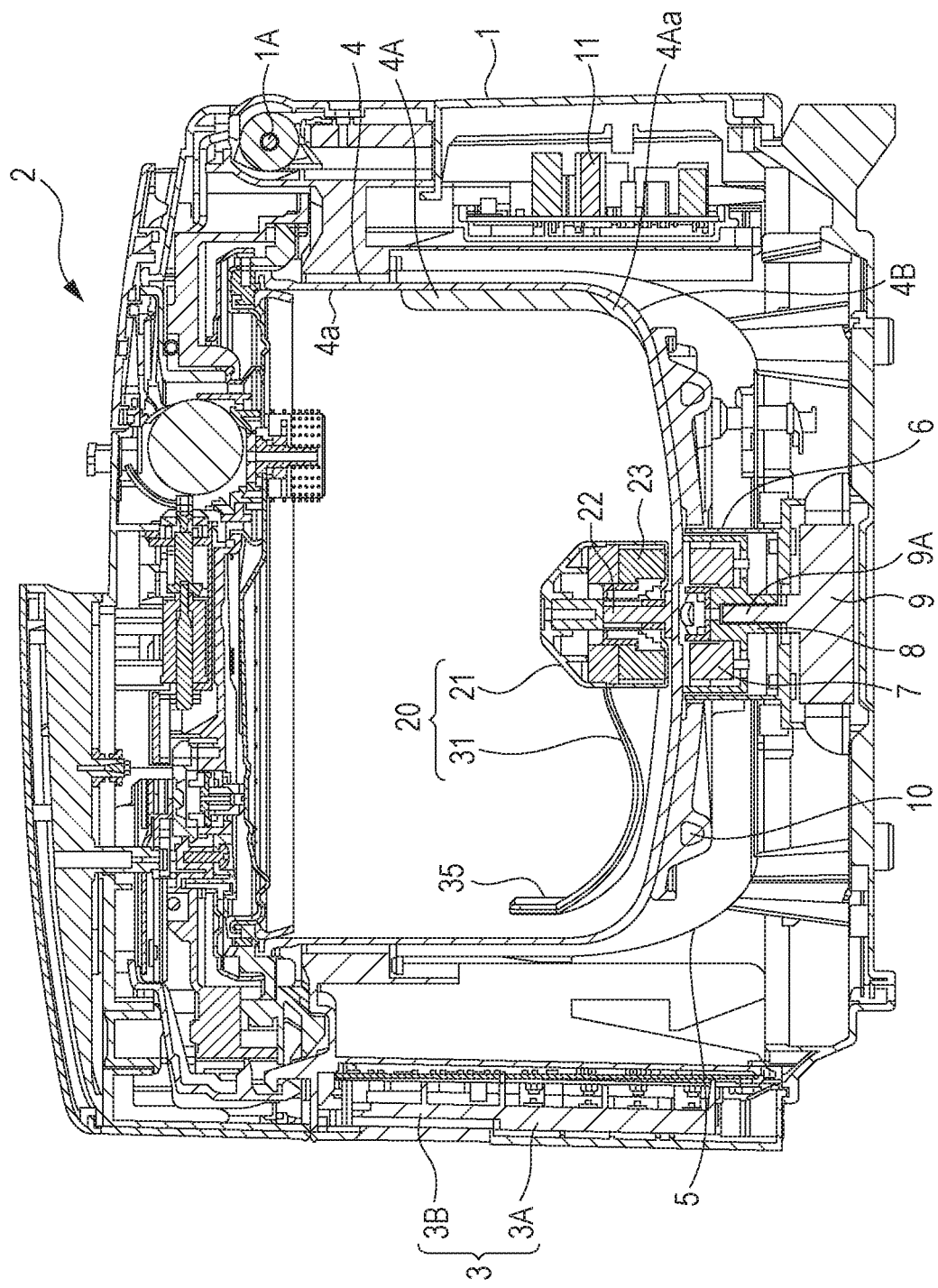
FIG. 12 is a sectional view of a heating cooker according to a second exemplary embodiment of the present invention.
Figure 13:
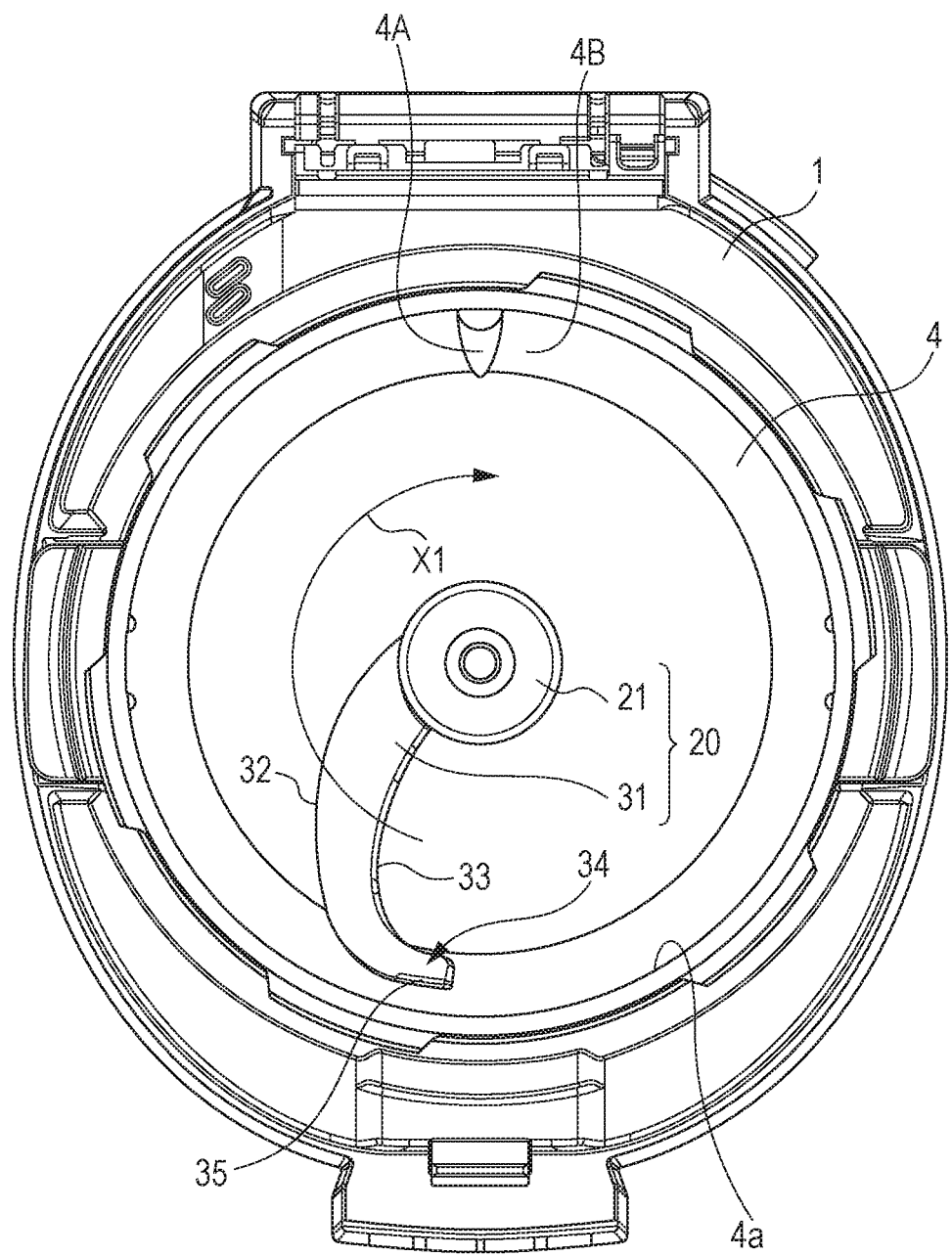
FIG. 13 is a plan view illustrating the heating cooker with a lid removed according to the second exemplary embodiment of the present invention.
Figure 14:
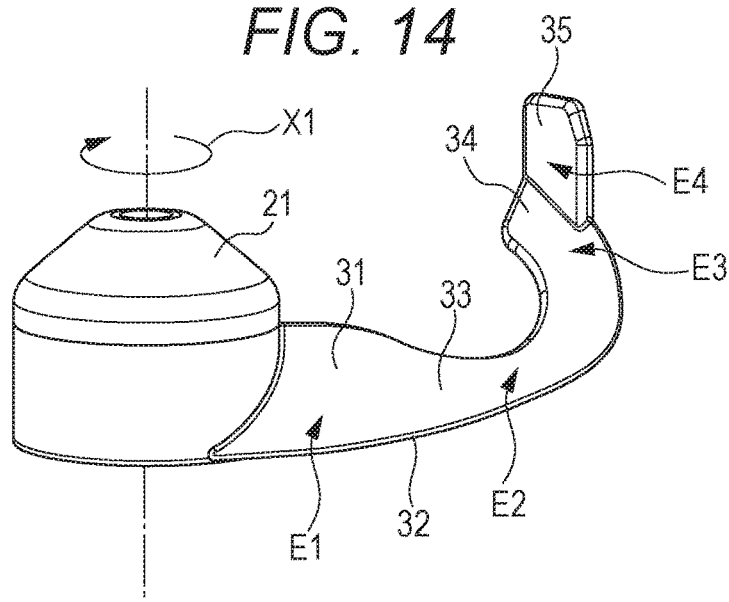
FIG. 14 is a perspective view of a stirring body of the heating cooker according to the second exemplary embodiment of the present invention.
Figure 15:
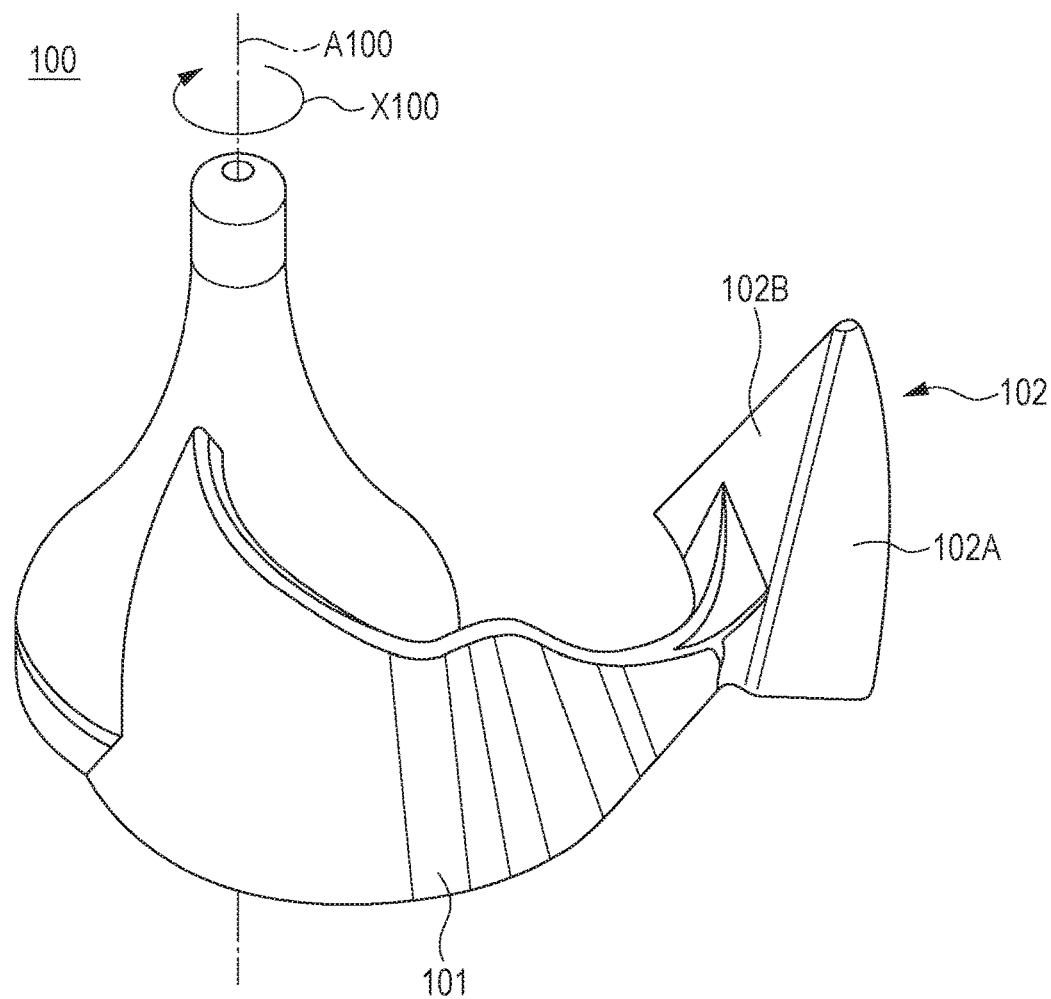
FIG. 15 is a perspective view of a stirring body of a conventional heating cooker.
Figure 16:
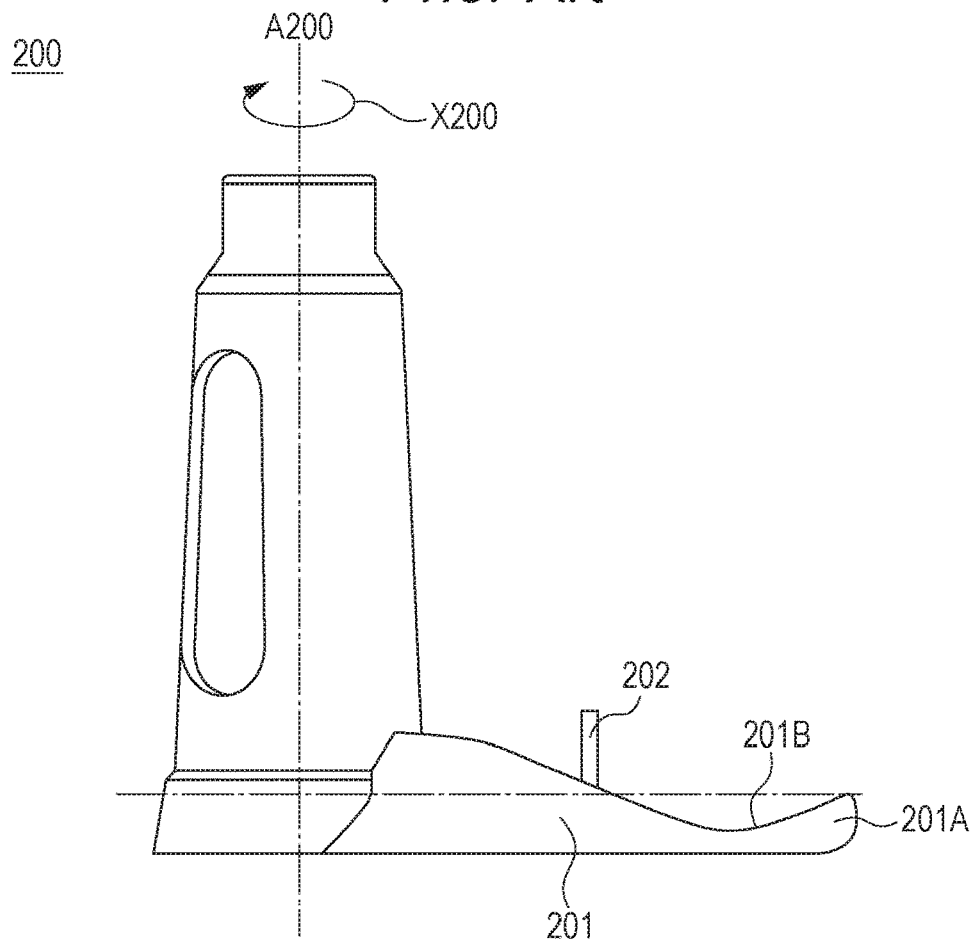
FIG. 16 is a plan view of a stirring body of another conventional heating cooker.
Figure 17:
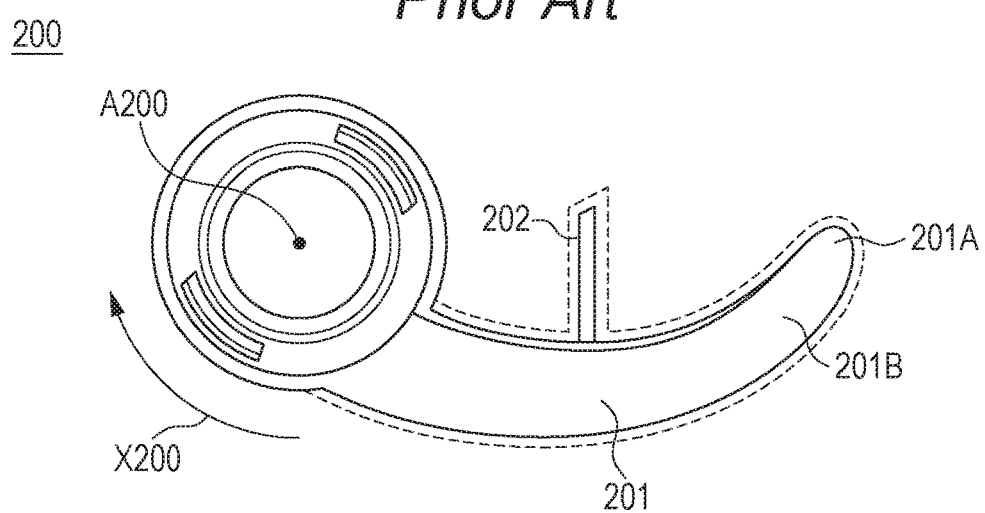
FIG. 17 is a side view of the stirring body of the other conventional heating cooker.

FIG. 12 is a sectional view of a heating cooker according to the second exemplary embodiment of the present invention. FIG. 13 is a plan view illustrating the heating cooker of FIG. 12 with a lid removed therefrom. FIG. 14 is a perspective view of a stirring body of the heating cooker of FIG. 12. The heating cooker of the second exemplary embodiment differs from the heating cooker of the first exemplary embodiment in that leading end portion 34 of blade 31 is provided with vertical wall 35 standing upward from front edge 32 along inner peripheral surface 4a of cooking container 4.

Vertical wall 35 functions to inhibit cooking materials that ride on third stirring region E3 along with rotation of blade 31 from falling toward and adhering to inner peripheral surface 4a of cooking container 4. In the present exemplary embodiment, a section corresponding to vertical wall 35 is referred to as "fourth stirring region E4" as shown in FIG. 14.

According to the heating cooker of the present exemplary embodiment, fourth stirring region E4 can inhibit the cooking materials from adhering to inner peripheral surface 4a of cooking container 4, so that both the relatively small and large cooking materials can be cooked more uniformly.

It is to be noted that these exemplary embodiments are not restrictive of the present invention, and the present invention can be carried out in other various exemplary embodiments. For example, in the structure shown in FIG. 11A, the starting end of lower end portion 4Aa of obstacle 4A is positioned on the bottom surface of cooking container 4; however, the present invention is not limited to this. The starting end of lower end portion 4Aa of obstacle 4A may be positioned, for example, on corner part 4B of cooking container 4.

In each of the exemplary embodiments, blade 31 is formed by twisting one plate member; however, the present invention is not limited to this. For example, blade 31 may be formed of resin in a three-dimensional manner by injection molding.

It is to be noted that any appropriate combination of the various embodiments can produce respective effects.

INDUSTRIAL APPLICABILITY

The present invention enables more uniform cooking of both the relatively small and large cooking materials and is thus useful for heating cookers each having a stirring function.

The invention claimed is:

1. A heating cooker having a stirring function, the heating cooker comprising a stirring body configured to stir cooking materials housed in a cooking container, wherein
the stirring body comprises:
a housing rotatably mounted to a center of a bottom surface of the cooking container; and
a blade extending from an outer peripheral surface of the housing toward an inner peripheral surface of the cooking container and curving convexly toward a downstream side in a rotating direction of the housing in a plan view, wherein
the blade has:
a front edge positioned on the downstream side in the rotating direction, and
a rear edge positioned on an upstream side in the rotating direction relative to the front edge,
wherein:
a leading end portion of the blade curves along the inner peripheral surface of the cooking container in the plan view and slopes upward toward the upstream side in the rotating direction,
the front edge is positioned below the rear edge near the housing,
the front edge is positioned above the rear edge near the leading end portion, and
an upper end of the leading end portion of the blade is positioned above an upper end of a junction between the blade and the housing.

2. The heating cooker according to claim 1, wherein the front edge and the rear edge are formed to be positioned at an identical height or substantially identical height near the inner peripheral surface of the cooking container.

3. The heating cooker according to claim 1, wherein the rear edge is positioned closer to the housing than the front edge is near the leading end portion of the blade.

4. The heating cooker according to claim 1, wherein a shortest distance between the front edge and the rear edge in a cross section of the blade taken along the rotating direction shortens toward the leading end portion in a plan view.

5. The heating cooker according to claim 1, wherein the blade is formed by twisting one plate member.

6. The heating cooker according to claim 1, wherein the junction between the blade and the housing is formed to be inclined at an angle ranging from 20° to 40° with respect to a plane parallel to the rotating direction.

7. The heating cooker according to claim 1, wherein at the leading end portion of the blade, the front edge is formed to be inclined at an angle ranging from 30° to 50° with respect to a plane parallel to the rotating direction.

8. The heating cooker according to claim 1, wherein
the inner peripheral surface of the cooking container is provided with at least one obstacle that extends in an up-and-down direction and projects toward a center of the cooking container; and
a lower end portion of the obstacle curves along a corner part between the bottom surface and the inner peripheral surface of the cooking container.

9. The heating cooker according to claim 1, wherein the stirring body is detachably mounted to the center of the bottom surface of the cooking container via a magnetic coupling.

10. A heating cooker having a stirring function, the heating cooker comprising a stirring body configured to stir cooking materials housed in a cooking container, wherein
the stirring body comprises:
a housing rotatably mounted to a center of a bottom surface of the cooking container; and
a blade extending from an outer peripheral surface of the housing toward an inner peripheral surface of the cooking container and curving convexly toward a downstream side in a rotating direction of the housing in a plan view, wherein
the blade has:
a front edge positioned on the downstream side in the rotating direction, and
a rear edge positioned on an upstream side in the rotating direction relative to the front edge,
wherein:
a leading end portion of the blade curves along the inner peripheral surface of the cooking container in the plan view and slopes upward toward the upstream side in the rotating direction,
the front edge is positioned below the rear edge near the housing,
the front edge is positioned above the rear edge near the leading end portion, and the leading end portion of the blade is provided with a vertical wall standing upward from the front edge along the inner peripheral surface of the cooking container.

11. A heating cooker having a stirring function, the heating cooker comprising a stirring body configured to stir cooking materials housed in a cooking container, wherein the stirring body comprises:
- a housing rotatably mounted to a center of a bottom surface of the cooking container;
- a blade extending from an outer peripheral surface of the housing toward an inner peripheral surface of the cooking container and curving convexly toward a downstream side in a rotating direction of the housing in a plan view, wherein
the blade has:
- a front edge positioned on the downstream side in the rotating direction, and
- a rear edge positioned on an upstream side in the rotating direction relative to the front edge, wherein:
- a leading end portion of the blade curves along the inner peripheral surface of the cooking container in the plan view and slopes upward toward the upstream side in the rotating direction,
- the front edge is positioned below the rear edge near the housing, and
- the front edge is positioned above the rear edge near the leading end portion; and wherein:
- the inner peripheral surface of the cooking container is provided with at least one obstacle that extends in an up-and-down direction and projects toward a center of the cooking container;
- a lower end portion of the obstacle curves along a corner part between the bottom surface and the inner peripheral surface of the cooking container; and
- a starting end of the lower end portion of the obstacle is positioned on the bottom surface of the cooking container.

* * * * *